(12) United States Patent  
Puccini

(10) Patent No.: US 7,825,333 B2  
(45) Date of Patent: Nov. 2, 2010

(54) PAD-MOUNTED TERMINATION ENCLOSURE

(75) Inventor: Kevin F. Puccini, Cincinnati, OH (US)

(73) Assignee: Connector Manufacturing Company, Hamilton, OH (US)

( * ) Notice: Subject to any disclaimer, the term of this patent is extended or adjusted under 35 U.S.C. 154(b) by 544 days.

(21) Appl. No.: 11/784,456

(22) Filed: Apr. 6, 2007

(65) Prior Publication Data

US 2008/0244990 A1    Oct. 9, 2008

(51) Int. Cl.
*H02G 3/08* (2006.01)

(52) U.S. Cl. .................... 174/50; 174/520; 174/88 B; 174/71 B; 361/600; 361/624; 361/648; 312/223.1

(58) Field of Classification Search .......... 174/480, 174/481, 50, 17 R, 520, 377, 70 B, 71 B, 174/88 B; 220/3.2–3.8, 4.02; 361/600, 601, 361/624, 637, 648, 649, 724, 730, 752, 678; 312/223.1, 223.2, 223.3, 223.6
See application file for complete search history.

(56) References Cited

U.S. PATENT DOCUMENTS

| | | | | | |
|---|---|---|---|---|---|
| 3,912,348 | A | * | 10/1975 | Seymour | 220/3.8 |
| 4,025,826 | A | * | 5/1977 | Wilson et al. | 361/624 |
| 4,079,439 | A | * | 3/1978 | Coles et al. | 361/637 |
| 4,366,528 | A | * | 12/1982 | Cole | 361/637 |
| 4,528,614 | A | * | 7/1985 | Shariff et al. | 361/678 |
| 6,185,098 | B1 | * | 2/2001 | Benavides | 312/223.1 |
| 6,225,554 | B1 | * | 5/2001 | Trehan et al. | 174/377 |
| 6,348,655 | B1 | * | 2/2002 | Wright | 174/50 |
| 6,359,217 | B1 | * | 3/2002 | Thompson et al. | 174/50 |
| 6,467,640 | B1 | * | 10/2002 | Hung | 174/50 |
| 6,472,605 | B1 | * | 10/2002 | Griffith | 174/70 B |
| 6,838,616 | B2 | * | 1/2005 | Harrison et al. | 174/50 |
| 6,877,827 | B2 | * | 4/2005 | Holighaus et al. | 312/223.1 |
| 7,504,581 | B2 | * | 3/2009 | Adducci et al. | 174/50 |

* cited by examiner

*Primary Examiner*—Angel R Estrada  
(74) *Attorney, Agent, or Firm*—Holland & Knight LLP

(57) ABSTRACT

A pad-mounted termination enclosure is provided having a pair of side panels on opposite sides of the termination enclosure, each side panel having attached thereto a plurality of buss bar attachment means, with the buss bar attachment means cooperating in pairs to support a plurality of buss bars extending between opposing side panels. A first door is attached to one of the side panels, and a second door is attached to the other of the side panels. An upper horizontal member extends between the side panels generally above the first door, and another upper horizontal member extends between the side panels above the second door. The termination enclosure also includes a lid positioned atop the pair of side panels and each of the upper horizontal members, with the lid being removably attached to the termination enclosure by lid attachment. In one embodiment the buss bar is a lay-in buss bar. A cover for the buss bar is also provided in one embodiment. A deadfront panel is also provided in an embodiment, retained between the upper horizontal member and the lower horizontal member.

16 Claims, 9 Drawing Sheets

PAD-MOUNTED TERMINATION ENCLOSURE

BACKGROUND OF THE INVENTION

1. Field of the Invention

This invention relates generally to termination enclosures, and more particularly, to a pad-mounted termination enclosure possessing structural features which makes it easier to connect the electric utility line to customer feeders.

2. Description of the Related Art

This invention is directed to the providing of a pad-mounted termination enclosure of the type that is used to connect an electric utility line to multiple customer feeders. Termination enclosures are old in the art. They can either be installed on a post or wall, or be pad-mounted.

Larger termination enclosures are typically of the pad-mounted variety. Inside such a termination enclosure, cables come in from a transformer and are attached to a buss bar, with the buss bar then being connected to cables which take the electricity out to various commercial and/or industrial businesses.

When the cables are initially being installed in the termination enclosure, a couple of situations typically occur. Due to the weight of the cables to be pulled, a crane is often used to facilitate the pulling of the cables underground from a transformer to the termination enclosure, and then upwardly into the enclosure itself. Heretofore, since prior art enclosures all have featured a non-removable top with a door on one or on opposite sides of the termination enclosure, the cables typically are pulled out through at least one door. Then the cable to be connected is pushed back into the termination enclosure where it is connected to the buss bar. Complicating the problem, these cables can often be relatively stiff due to their diameter, so more cable is pulled into the enclosure than is actually needed, with this additional length of cable being cut off, resulting in the waste of both cable and money.

Due to this rather labor intensive process, some termination enclosures have had their outer shell fabricated from fiberglass, so that when it becomes necessary to connect a cable to a buss bar, the entire outer enclosure is lifted. However, this is also time consuming and relatively expensive to accomplish.

Another feature of prior art termination enclosures is that they have either used flat copper buss plates (a flat buss) to which the cables are connected using electrical connectors well known in the art, or an elongated buss bar which has a plurality of recesses extending upwardly from its bottom surface. In this latter type of buss bar, the cable is stuck up into the recess and then secured in place typically using a screw-type of retention means also well known in the electrical connection art. Again, there can be problems due to the relative stiffness of the cable, which also translates into additional installation time.

Another problem associated with the prior art termination enclosures is that the stiffness of the cables and having to bend them in order to get them into the enclosure often results in having to pull only a few cables at a time. By having to repeat the process several times to finally get all of the cables pulled into the termination enclosure results in a significant expenditure of time and money.

It is thus apparent that the need exists for a termination enclosure that makes it easier to connect an electric utility line to customer feeders, and which is relatively easy and cost effective to fabricate and utilize.

SUMMARY OF THE INVENTION

In accordance with the present invention, there is disclosed a pad-mounted termination enclosure having a pair of side panels on opposite sides of the termination enclosure, each side panel having attached thereto a plurality of buss bar attachment means, with the buss bar attachment means cooperating in pairs to support a plurality of buss bars extending between opposing side panels. A first door is attached to one of the side panels, and a second door is attached to the other of the side panels. An upper horizontal member extends between the side panels generally above the first door, and another upper horizontal member extends between the side panels above the second door. The termination enclosure also includes a lid positioned atop the pair of side panels and each of the upper horizontal members, with the lid being removably attached to the termination enclosure by lid attachment means.

Preferably the lid attachment means includes quick release levers, each of the quick release levers having an end portion, with the side panels having apertures formed therein for the receipt of each end portion. In one embodiment of the invention, the buss bar is a lay-in buss bar. Optionally, at least one of the buss bars has a protective cover draped thereon. In this embodiment, each of the upper horizontal members is easily detachable from the opposed side panels.

The termination enclosure of this embodiment includes a lower horizontal member extending between the side panels generally below the first door, and another lower horizontal member extending between the side panels below the second door, and includes a deadfront panel in contact with the upper horizontal member and said lower horizontal member.

There is also disclosed a pad-mounted termination enclosure a pair of side panels on opposite sides of the termination enclosure, with each side panel having attached thereto a plurality of buss bar attachment means, the buss bar attachment means cooperating in pairs to support a plurality of lay-in buss bars extending between the side panels. A first door is attached to one of the side panels, and a second door is attached to the other of the side panels.

The termination enclosure of this embodiment has an upper horizontal member extending between the side panels generally above the first door, and another upper horizontal member extending between the side panels above the second door. Additionally, a lid is positioned atop the pair of side panels and each of the upper horizontal members.

In one embodiment, at least one of the buss bars has a protective cover draped thereon. In one embodiment, each of the upper horizontal members is easily detachable from the opposed side panels. The termination enclosure includes a lower horizontal member extending between the side panels generally below the first door, and another lower horizontal member extending between the side panels below the second door, and which includes a deadfront panel in contact with the upper horizontal member and the lower horizontal member. In this embodiment, the lid is removably detached to the termination enclosure by lid attachment means. Preferably, the lid attachment means comprise quick release levers, with each of the quick release levers having an end portion, and with the side panels having apertures formed therein for the receipt of each end portion.

There is also disclosed a pad-mounted termination enclosure having a pair of side panels on opposite sides of the termination enclosure, with each side panel having attached thereto a plurality of buss bar attachment means, with the buss bar attachment means cooperating in pairs to support a plurality of lay-in buss bars extending between the side panels.

The termination enclosure has a first door attached to one of the side panels, and a second door attached to the other of the side panels. An upper horizontal member extends between the side panels generally above the first door, and another upper horizontal member extending between the side panels above the second door, with each of the upper horizontal members being easily detachable from the opposed side panels, and with a lid positioned atop the pair of side panels and each of the upper horizontal members, with the lid being removably attached to the termination enclosure by lid attachment means.

In this embodiment, at least one of the buss bars has a protective cover draped thereon. Also, the termination enclosure includes a lower horizontal member extending between the side panels generally below the first door, and another lower horizontal member extending between the side panels below the second door, and which includes a deadfront panel in contact with the upper horizontal member and the lower horizontal member. Additionally, in this embodiment the lid attachment means are quick release levers, with each of the quick release levers having an end portion, with the side panels having apertures formed therein for the receipt of each end portion.

The primary objective of this invention is to provide a termination enclosure that makes it easier to connect an electric utility line to customer feeders.

Another objective of this invention is to provide such a device with additional safety measures incorporated into its construction to assist workers when they have to open the termination enclosure subsequent to the time of the initial installation therein of the utility line.

Other objects and advantages of the invention will be apparent from the following description, the accompanying drawings and the appended claims.

Figure 1:
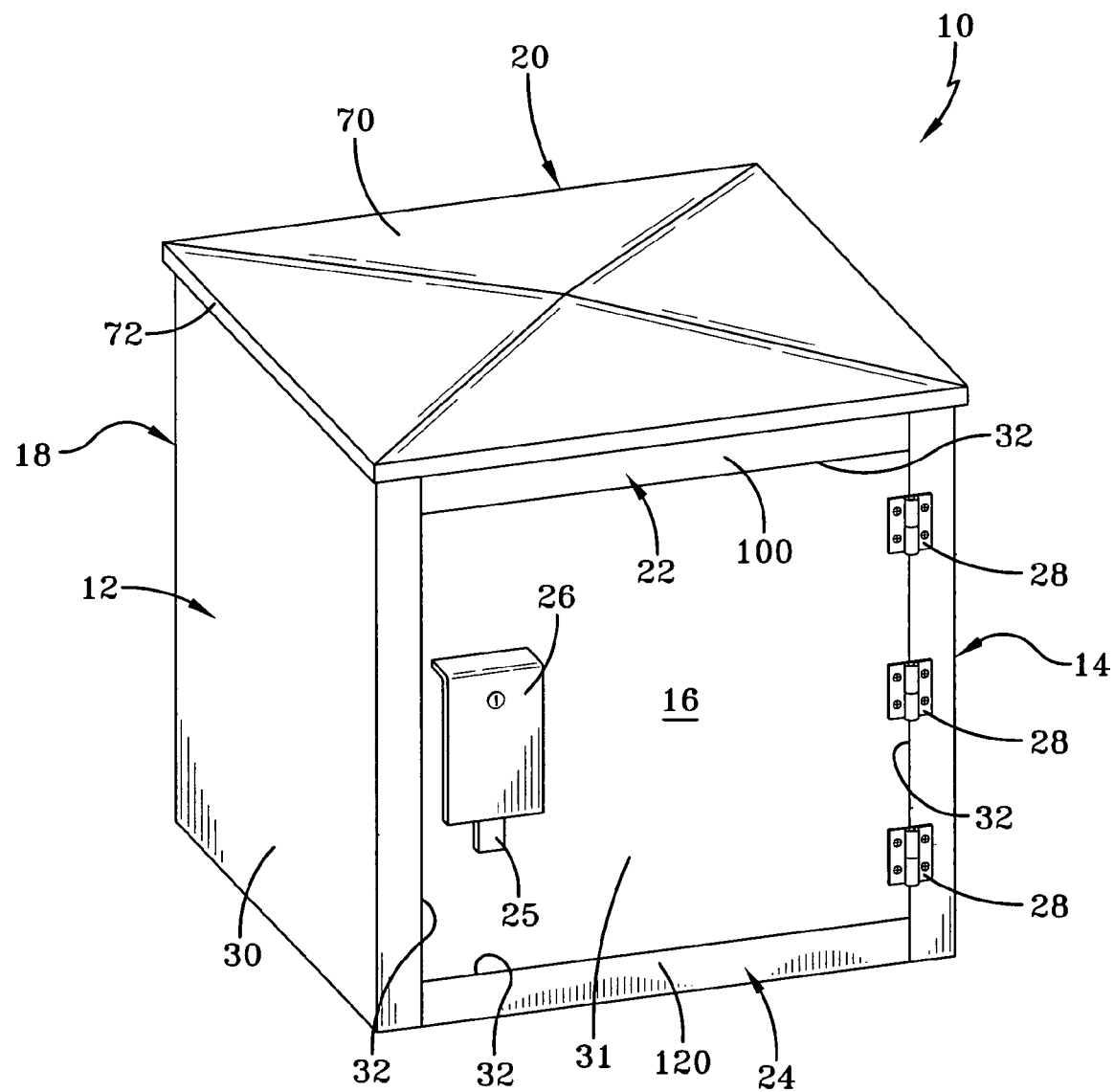
FIG. 1 is a perspective view of a pad-mounted termination enclosure made in accordance with this invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

This invention addresses the above limitations associated with prior art termination enclosures resulting in a termination enclosure possessing structural features which makes it easier to connect the electric utility line to customer feeders. Additionally, the termination enclosure has improved safety features. Having reference to the drawings, attention is directed first to FIG. 1, which discloses a termination enclosure made in accordance with this invention and designated generally by the numeral 10. From this view, the termination enclosure appears substantially similar to some other prior art pad-mounted termination enclosures. However, it will readily be appreciated that there are significant differences between this termination enclosure and the prior art which results in a number of advantages both in initial installation but also in subsequent uses.

The termination enclosure 10 is fabricated having a side panel 12, another side panel 14 on the opposite side of the enclosure 10, a first door 16, a second door 18, and a lid 20. Above each door is an upper horizontal member 22, while below each door is a lower horizontal member 24. Each door is equipped with a handle 25 and handle cover, with the handle being of the type used in prior art termination enclosures. Each door is attached to the termination enclosure by suitable door attachment means 28, shown as being a set of lift-off hinges. While FIG. 1 looks at the device facing the first door 16, FIG. 2 looks at the device from the opposite end such that it looks at the second door 18.

Figure 3:
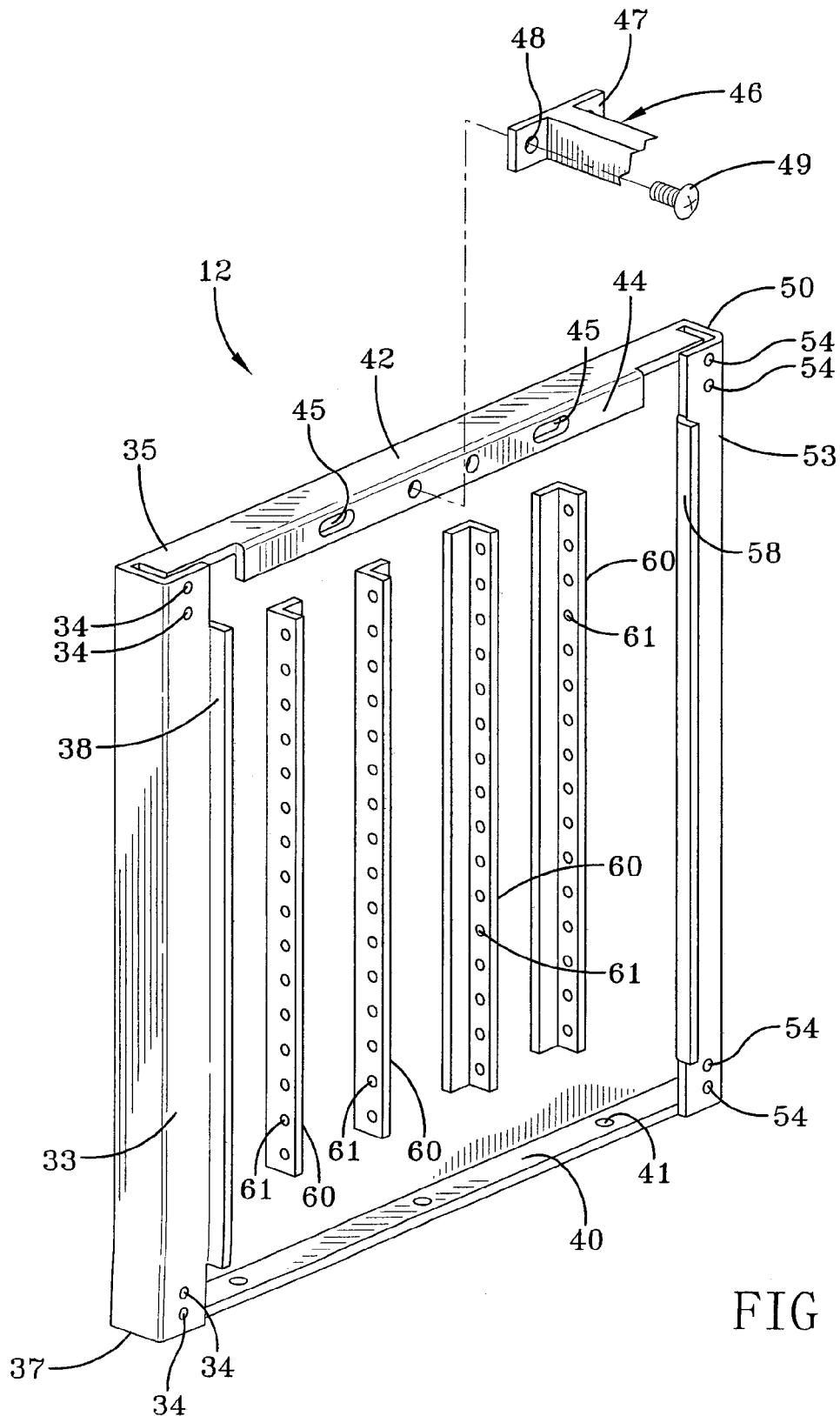
FIG. 3 is a perspective view of a side panel of this invention.
Figure 4:
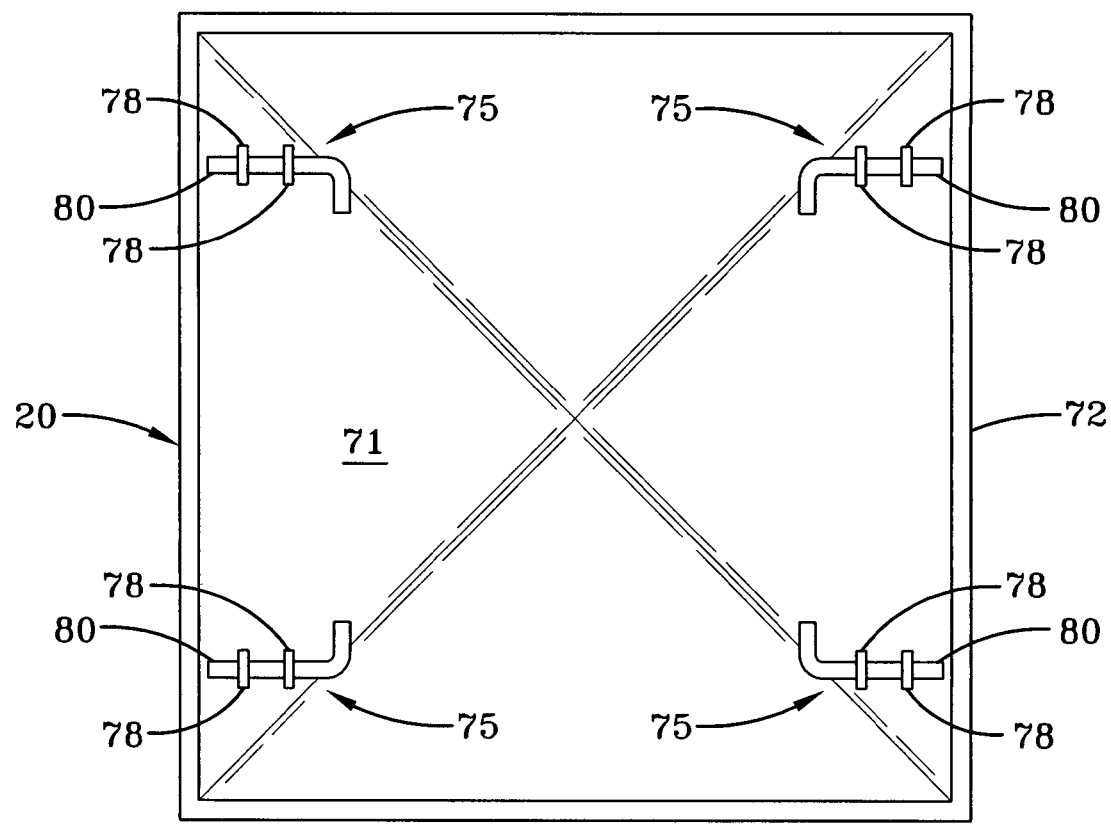
FIG. 4 is a bottom plan view of the lid of the invention once removed.
Figure 5:
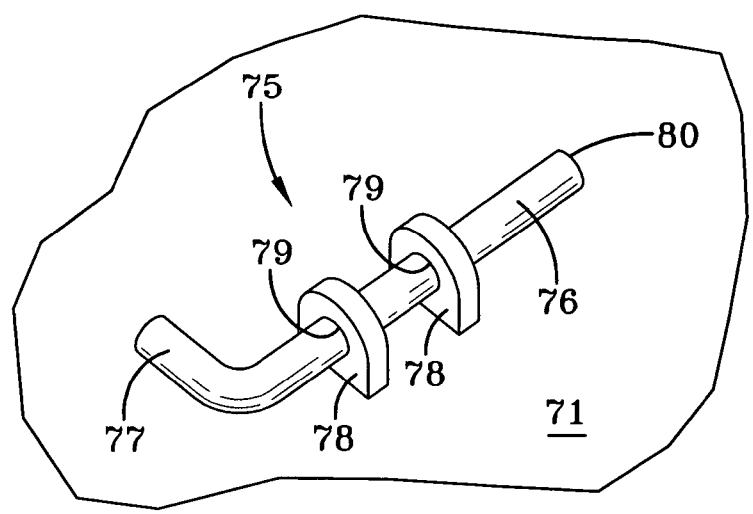
FIG. 5 is a perspective view on an enlarged scale of the lid fastening means of the invention shown in FIG. 4.

Each of the side panels 12 and 14 are identical, so that the first side panel 12 is shown in FIG. 3 as representative of both. Each side panel has an outer side surface 30. The first door 16 has a first door outer surface 31, a first door flange 32 that extends towards the interior of the termination enclosure, with the first door flange 32 having a gasket member at its end to assist in the providing of a moisture barrier when the door is shut.

Side panel 12 has a first door inner attachment flange 33 having first door inner attachment flange apertures 34. The apertures at the top of the first inner door attachment flange 33 are used to secure the side panel 12 to the upper horizontal member 22. Meanwhile, the apertures at the bottom of the first inner door attachment flange 33 are used to secure the side panel 12 to the lower horizontal member 24. In both cases, suitable fastening means is used such as nuts and bolts.

Each side panel also has a side panel top edge 35 and a side panel bottom edge 37. Extending part of the way between the top edge 35 and bottom edge 37 of each side panel along the vertical edge of first door inner attachment flange 33 is first door inner attachment flange lip 38. When the termination enclosure is fully assembled, this lip 38 provides a door stop for the first door 16, as well as assists in the establishment of the moisture seal with the gasket on the first door flange 32.

The side panel bottom edge 37 has a side panel bottom edge flange 40 that extends horizontally inwardly from the outer side surface 30 of the side panel. In this bottom edge flange 40 are a plurality of apertures to assist in securing the termination enclosure to the pad on which it rests, with this securing being done in a manner well known in the art of pad-mounted termination enclosures.

Along the top of each side panel is a side panel top edge horizontal flange 42 that extends inwardly from the side panel outer surface generally parallel to the bottom edge flange 40. Extending perpendicularly downward from the innermost portion of the top edge horizontal flange 42 is a side panel top edge vertical flange 44. The length of this vertical flange will be appreciated from FIG. 3 as being less than the length of the top edge horizontal flange 42. Additionally, the side panel top edge vertical flange 44 has formed therein a plurality of top edge vertical flange apertures 45 to assist in the attachment of the lid 20 to the rest of the termination enclosure.

Figure 11:
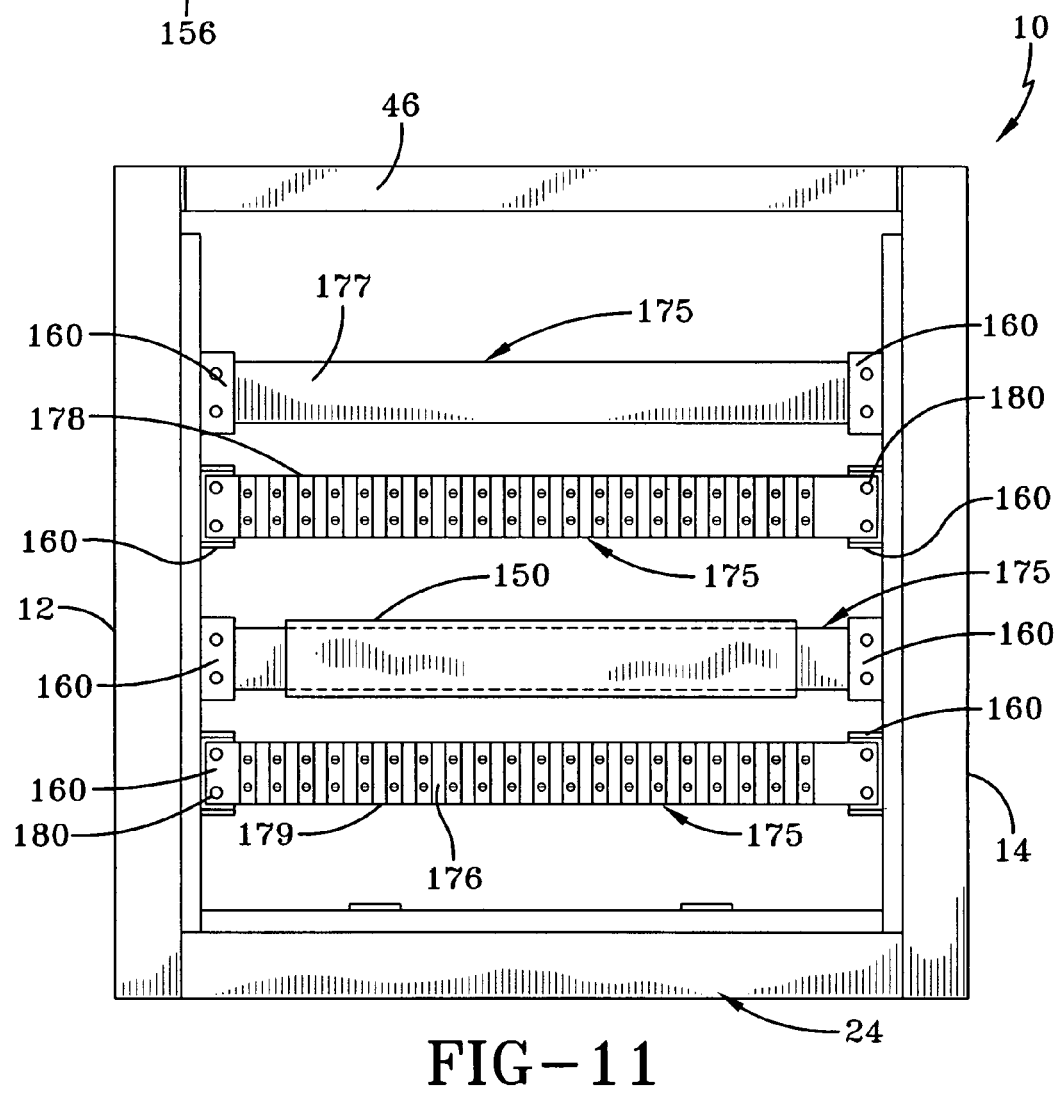
FIG. 11 is a front elevational view of the invention with the lid, doors, and each upper horizontal member removed.

As can best be appreciated from a comparison of FIGS. 3 and 11, a lid auxiliary support member 46, shown by way of example as being in the nature of a crossbar, extends between the two side panels 12 and 14. The point of attachment is near the midpoint of the side panel top edge vertical flange 44. The lid auxiliary support member 46 has a pair of mounting flanges 47, one on either side of the crossbar portion of the support member. Each mounting flange 47 has mounting flange apertures 48 through which lid auxiliary support member fastening means 49 pass to secure the lid auxiliary support member 46 to each side panel.

Each side panel also has a vertical flange 50 that connects the outer side surface 30 of each side panel to the corresponding inner attachment flange 33 or 53, depending on whether the vertical flange is directly adjacent the first door 16 or the second door 18. The second door has a second door outer surface 51 and a second door flange 52 with gasket that corresponds to the structure of the first door. The end of the side panel nearest the second door has a second door inner attachment flange 53, second door inner attachment apertures 54 which permit the securing of the upper horizontal member 22 above the second door to the side panel, and which permit the securing of the lower horizontal member 24 below the second door to the side panel in the same manner as discussed above with respect to the first door side of the invention. Additionally, there is a second door inner attachment flange lip 58 that corresponds to the first door inner attachment flange lip 38.

Figure 13:
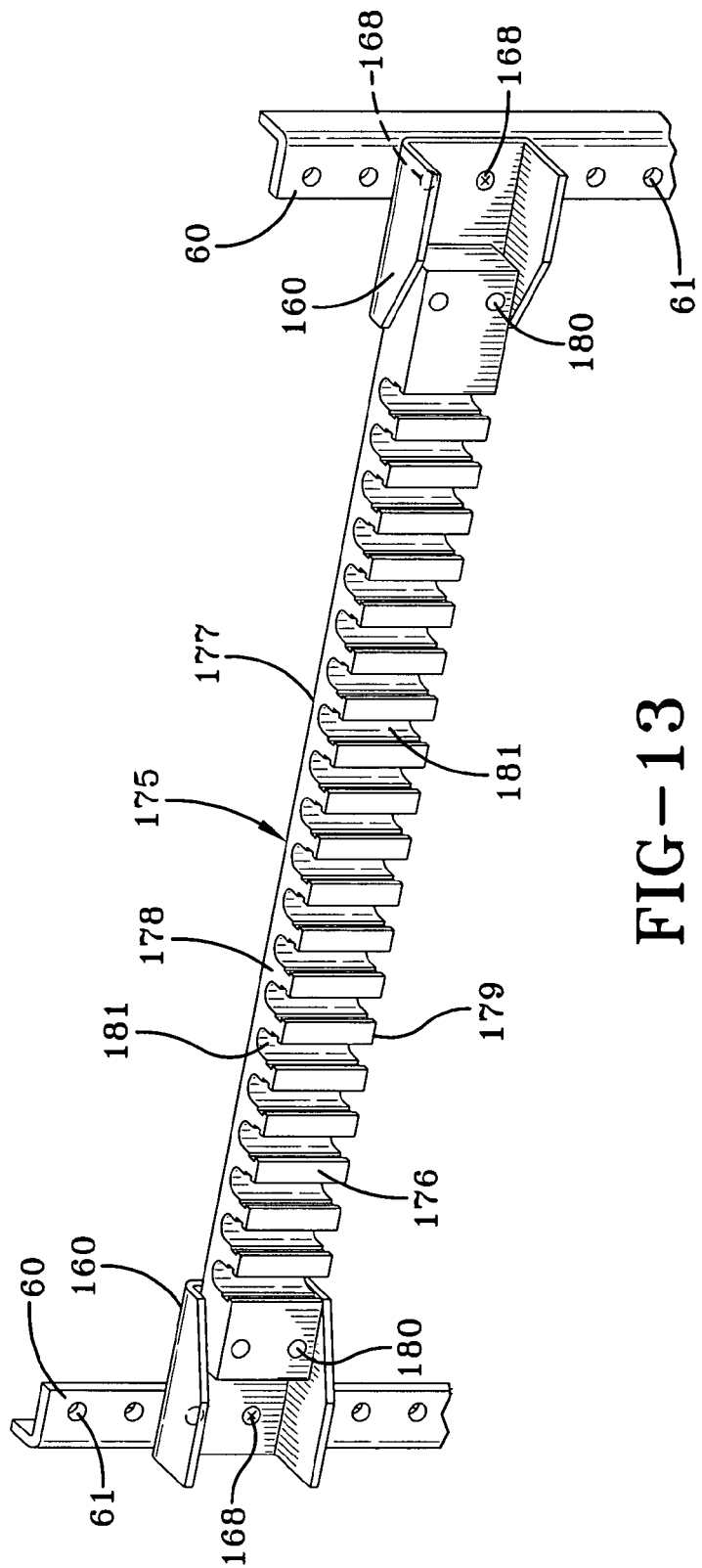
FIG. 13 is an exploded perspective view of a lay-in buss bar component of the invention.

As can best be appreciated from a comparison of FIGS. 3 and 13, on the interior surface of each side panel are a plurality of buss bar attachment means 60. Although shown by way of example as four separate sections of angle iron which extend from a point basically below the side panel top edge vertical flange to a point basically above the side panel bottom edge flange 40, although the specific structure of the buss bar attachment means is not believed to be critical. The buss bar attachment means 60 includes a plurality of buss bar attachment apertures to facilitate the vertical placement of the various buss bars utilized in this invention. As shown, the termination enclosure is a three phase system with another buss bar being provided for a neutral line. The presence of a plurality of apertures in each buss bar attachment means provides for the vertical adjustability of each buss bar.

Turning now to a discussion of the lid 20 associated with the invention, its structure can best be appreciated from a comparison of FIGS. 1, 2, 4, and 5. The lid 20 has an upper surface 70 that is raised slightly at the center of the lid, with the embodiment of the invention shown in the drawings showing four slight bends in the metal of the lid, such that precipitation runs off the top of the lid more easily. The lid also has a lid inner surface 71 and a lid flange 72, which flange forms a sidewall for the lid that is shown as overlapping the lower portion of the termination enclosure.

Attached to the lid inner surface 71 are a plurality of lid attachment means which attach the lid to the side panels. In the embodiment of the invention shown in the drawings, the lid attachment means are quick release levers. Each lid attachment means features a rod 76 having a handle portion 77. Attached to the lid inner surface at the location of each lid attachment means is a bracket 78, or preferably two, to assist in easier closing of the lid. Each bracket 78 has a bracket aperture 79 through which each rod 76 passes. The end portion 80 of each lid attachment means projects, when the handle is pushed towards the nearest bracket, through the side panel top edge vertical flange aperture. When all of the lid attachment means have been pushed into position, the lid is securely attached to the lower portion of the termination enclosure. Conversely, just four pulls on the quick release levers permits the lid to be easily lifted off the termination enclosure.

Figure 2:
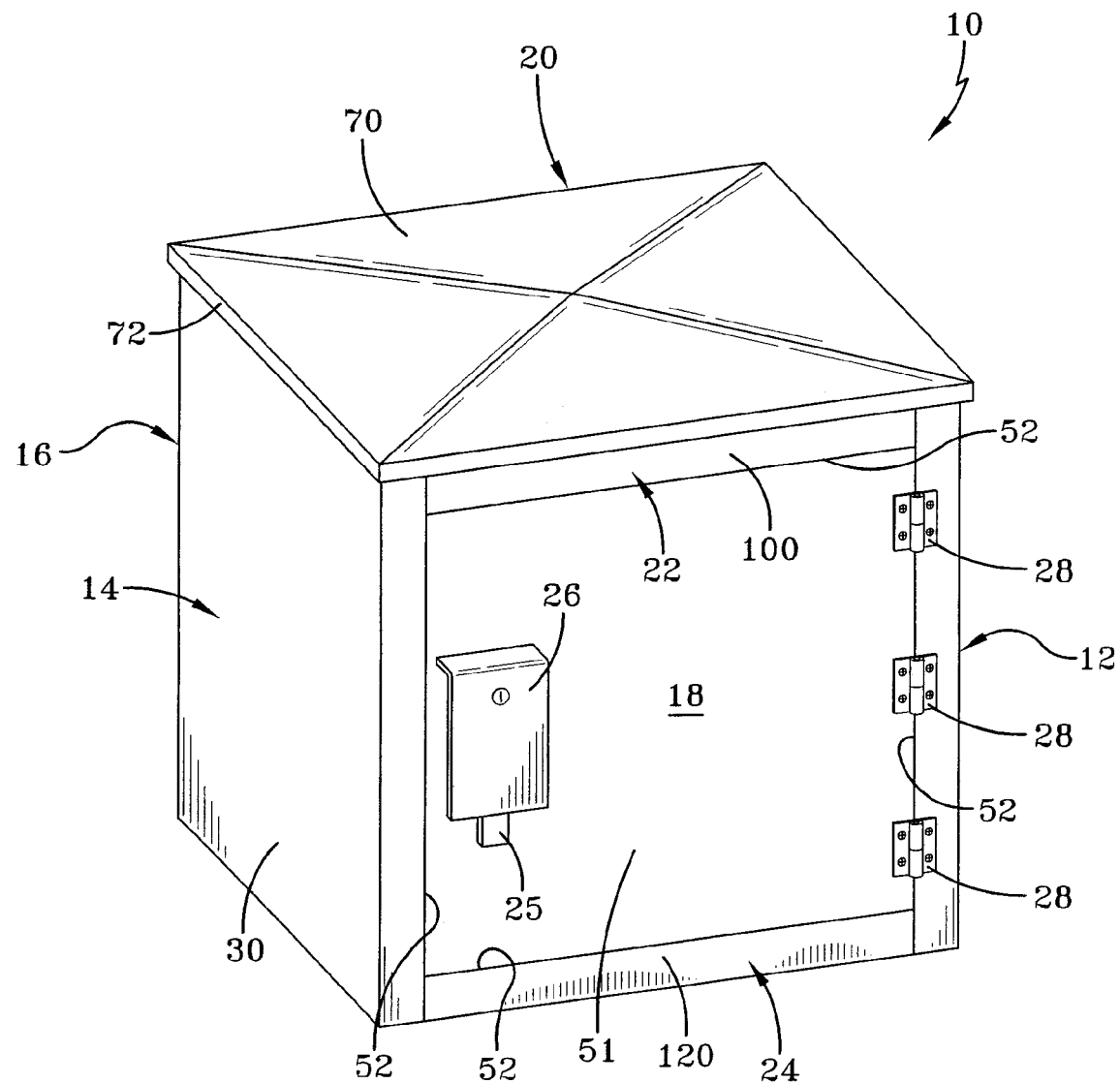
FIG. 2 is a perspective view of a pad-mounted termination enclosure made in accordance with this invention, taken from the opposite side of the invention shown in FIG. 1.
Figure 6:
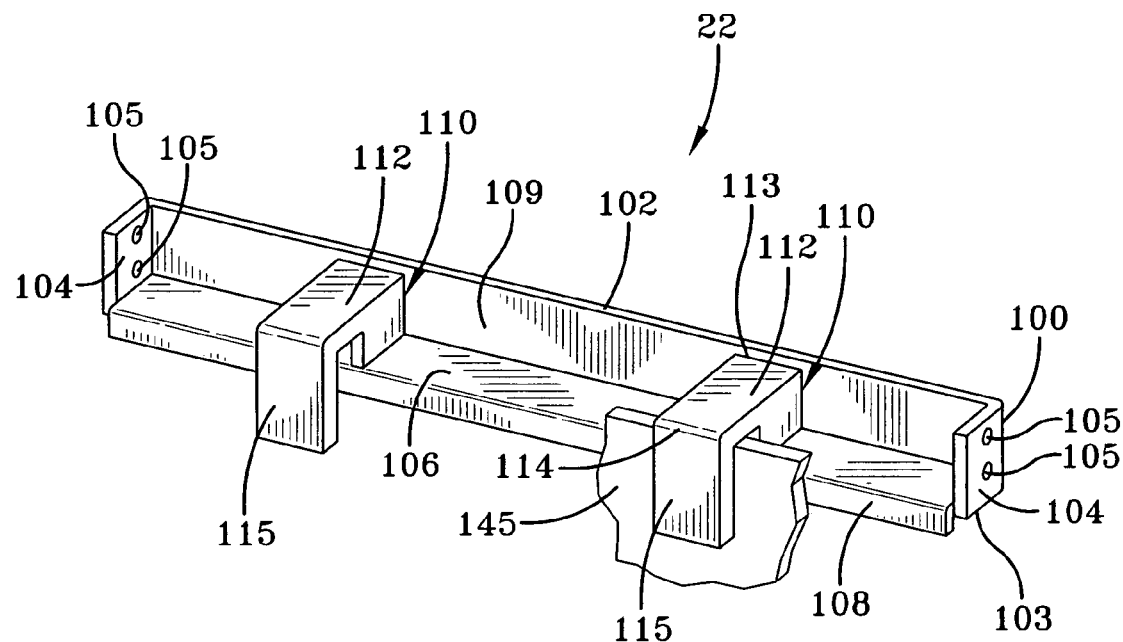
FIG. 6 is a perspective view of an upper horizontal member that is above a door of this invention.

The structure of the upper horizontal member 22 can best be appreciated from a comparison of FIGS. 1 and 6. When the termination enclosure is closed as in FIG. 1, only the outwardly facing panel 100 is visible. The outwardly facing panel 100 has a top edge 102 and a bottom edge 103. Extending inwardly at the side edges of the outwardly facing panel 100 is an inner attachment flange 104 having inner attachment flange apertures 105. Extending inwardly at the bottom edge 103 of the outwardly facing panel 100 is lower panel 106. Extending downwardly from the innermost portion of the lower panel 106 is lower panel lip 108.

The upper horizontal member 22 also has an outwardly facing panel inner wall 109. Secured to this inner wall 109 are a pair of upper deadfront panel retention brackets 110. This bracket has an upper surface 112 having a first end portion 113 that is secured to the inner wall 109. The second end portion 114 of the upper surface 112 having a downwardly depending portion 115 extending therefrom. Additionally, depending downwardly from the upper surface on each of its sides are a pair of sidewalls 114. It will be appreciated that a gap exists between the downwardly depending portion 115 and the lower panel lip 108, such that the optional deadfront panel component of the invention can be inserted into the gap. FIG. 6 discloses a fraction of the deadfront panel as it appears after insertion.

Figure 7:
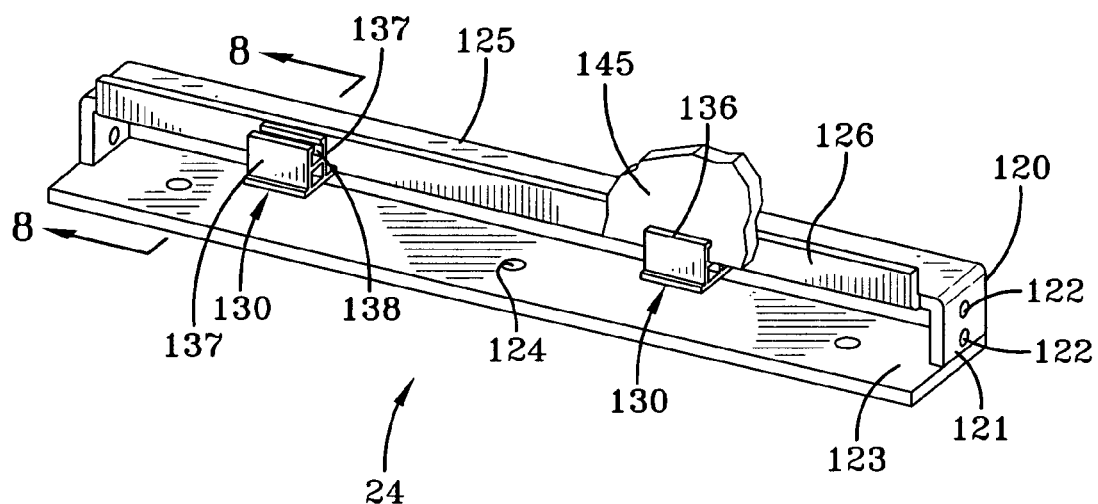
FIG. 7 is a perspective view of a lower horizontal member that is below a door of this invention.
Figure 8:
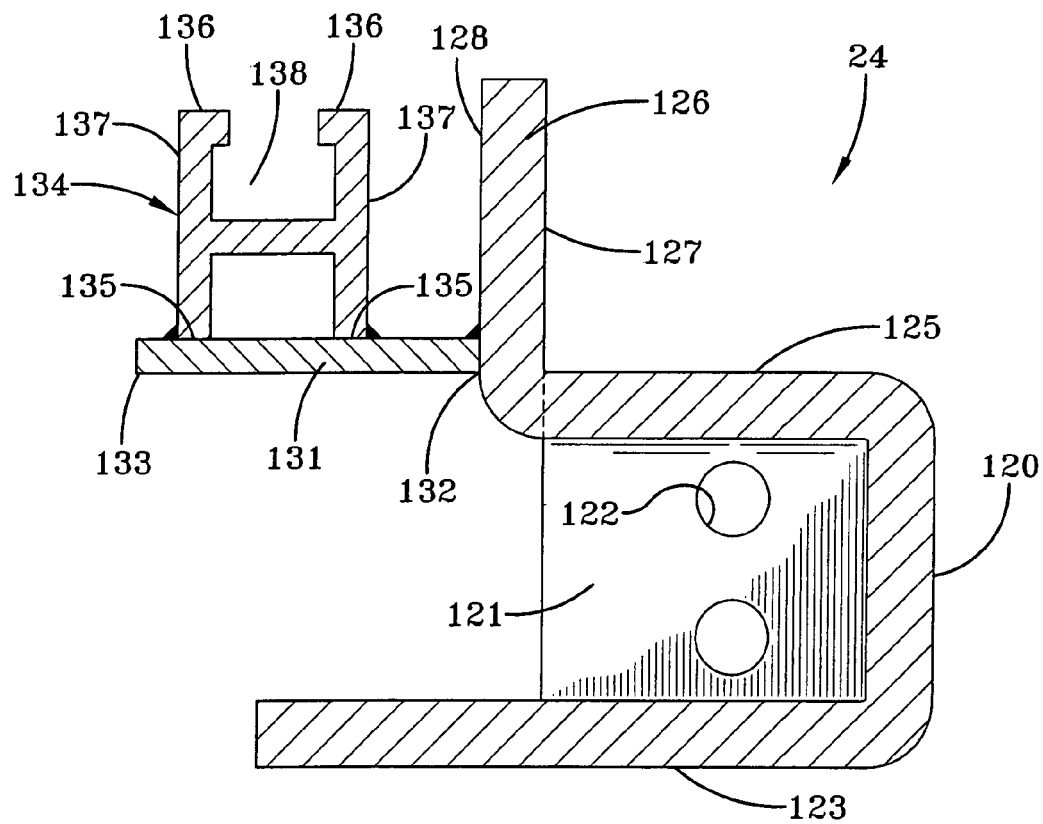
FIG. 8 is a vertical sectional view on a greatly enlarged scale taken along line 8-8 of FIG. 7.

The structure of the lower horizontal member 24 can best be appreciated from a comparison of FIGS. 1, 7, and 8. When the termination enclosure is closed as in FIG. 1, only the outwardly facing panel 120 is visible. Extending inwardly at the side edges of the outwardly facing panel 120 is a side flange member 121 having side flange member apertures 122 therein. Extending inwardly at the bottom edge of the outwardly facing panel 120 is lower flange member 123. Lower flange member apertures 124 are used similarly to side panel bottom edge flange apertures 41 to assist in securing the termination enclosure to its pad.

Extending inwardly at the top edge of the outwardly facing panel 120 is upper flange member 125. At the innermost end of the upper flange member 125, an upper flange member lip projects upwardly. Both it and the lower panel lip 108 cooperate with the inner attachment flange lips 38 and 59 to provide both a door stop and assist in providing a moisture barrier with respect to the first door and second door respectively.

The upper flange member lip 126 has an outer surface 127 and an inner surface 128. Extending inwardly from the inner surface 128 of the upper flange member lip 126 are a pair of lower deadfront panel retention brackets 130. The particular retention bracket 130 has a base plate 131 having a first end portion 132 and a second end portion 133. The first end portion 131 is secured to the inner surface 128 of the upper flange member lip 126. Projecting upwardly from the base 135 at a location closer to the second end portion 133 is lower deadfront panel retention means 134.

Figure 9:
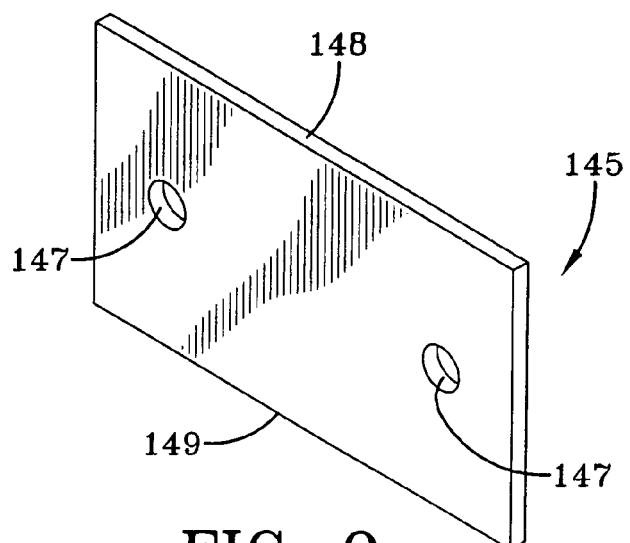
FIG. 9 is a perspective view of the optional plastic sheet that serves as a deadfront option.

The lower deadfront panel retention means 134 has a base 135, a top edge 136, and opposed sidewalls 137 such that a channel 138 is formed therebetween. The optional deadfront panel component of the invention can be inserted into the channel. FIG. 7 discloses a fraction of the deadfront panel as it appears after insertion. The deadfront panel itself is disclosed in FIG. 9. The deadfront panel 145 which is an optional feature of the invention is of Lexan®, a polycarbonate sheet material made by General Electric. A pair of hand apertures 147 permits the panel to be easily lifted for placement into the brackets of the termination enclosure or removal therefrom. The deadfront panel has a top edge 148 and a bottom edge 149, with its sides extending approximately the width of the enclosure door. A pair of such panels are optional components with the termination enclosure, one panel per door. The purpose of the deadfront panel is to prevent accidental worker access into the termination enclosure due to the potential for electrocution. Hopefully, prior to entrance into the enclosure, the realization of the existence of the deadfront panel will remind workers of the potential for danger.

Figure 10:
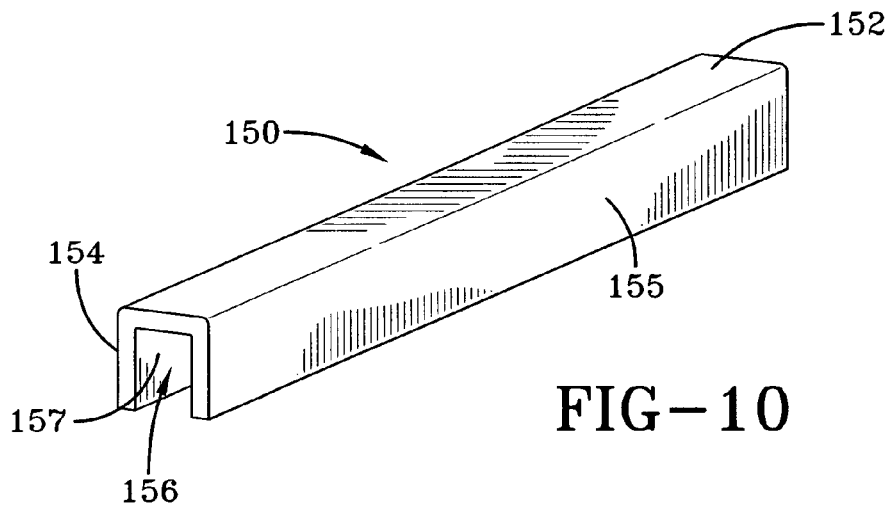
FIG. 10 is a perspective view of a protective cover for a buss bar used in the invention.

Another option related to protection is the buss bar protective cover 150 which can best be appreciated from a comparison of FIGS. 10 and 11. The cover is preferably made from a plastisol coated sheet, such that the end product has a top surface 152 and sidewalls 154, 155. As formed, the cover 150 has a channel 156 formed between the opposed sidewalls. FIG. 11 discloses one of the buss bars draped with the protective cover 150, with the inner surface 157 of the cover in contact with the buss bar. Once again, by utilizing the protective cover, workers are not as likely to accidentally come into contact with the buss bar when there is the possibility of electrocution.

Figure 12:
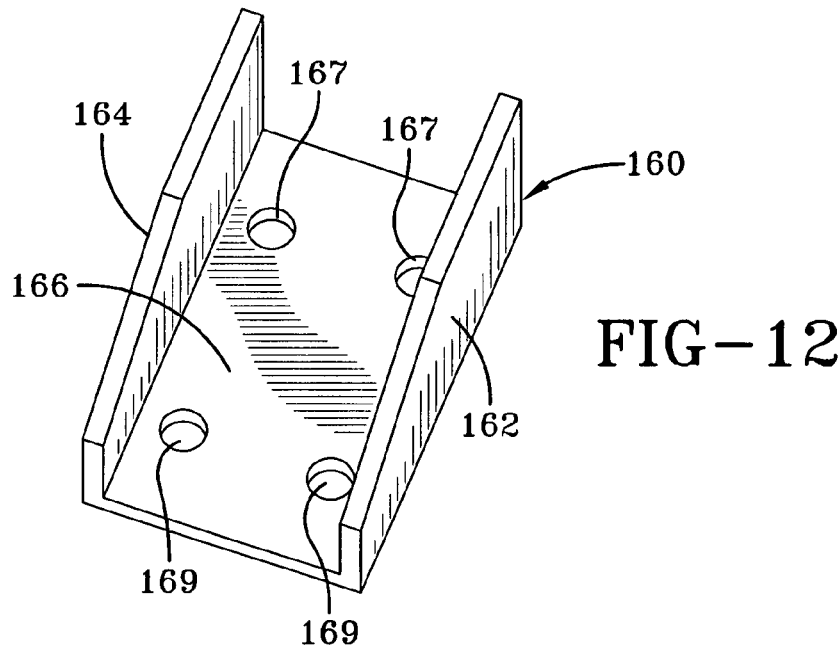
FIG. 12 is a perspective view of a buss bar bracket used in the invention.

A comparison of FIGS. 11, 12, and 13 discloses the buss bar bracket 160 used in this invention. The buss bar bracket 160 has a top portion 162, a bottom portion 164, and an attachment portion 166 which connects the top and bottom portions 162 and 164 respectively. The attachment portion 166 has attachment apertures 167 formed therein. Fasteners 168 secure the buss bar bracket 160 to the buss bar attachment means 60. The attachment portion 166 also has buss bar attachment apertures 169 which in cooperation with the buss bar apertures 180 and suitable fastener are used to secure the buss bar 175 to the bracket.

The buss bar 175 could be of the type known in the prior art, but in the preferred embodiment of the invention a unique buss bar is utilized in the form of a lay-in buss bar. Heretofore, the use of lay-in buss bars in termination enclosures has not been known to exist. Additionally, while some lay-in buss bars have as many as six channels in which a cable can be laid, the lay-in buss bar used in this invention has approximately three times as many channels.

Figure 14:
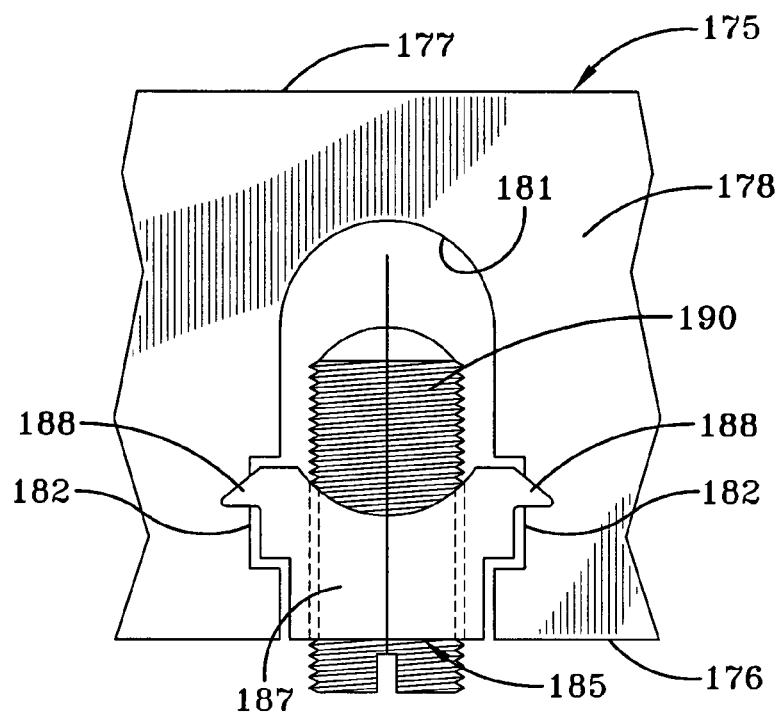
FIG. 14 is a top plan view of a section of a lay-in buss bar with a lay-in electrical connector installed in an operative embodiment.

As can be appreciated from a comparison of FIGS. 11, 13, and 14, the lay-in buss bar 175 has a front wall 176, a rear wall 177, a top 178 and a bottom 179. As mentioned above, buss bar apertures 180 facilitate attachment of the buss bar 175 to the buss bar bracket 160. The lay-in buss bar has a lay-in channel 181, with recessed portions 182 formed on each side of the channel. A lay-in nut 185 of the type known in the art, especially those sold by Connector Manufacturing Co., has a body 187 and nubs 188 which nubs preclude the lay-in nut from dropping through the buss bar with its vertically oriented channels. The lay-in nut also has a set screw 190 which can be screwed into the lay-in nut to contact the cable.

Turning now to other aspects related to the construction of the termination enclosure, while the walls of the enclosure are preferably made primarily of sheet aluminum, it could be fabricated from steel. The buss bar is also preferably made of aluminum. The brackets securing each buss bar to the side panels of the termination enclosure are fabricated from an insulative material, such as Glastic® made by Glastic Corp.

In actual use, the termination enclosure 10 is secured to its pad. Preferably the termination enclosure being used has a removable lid as described herein. If so, the lid is temporarily removed from the enclosure therefore making it much easier to pull the cables into the enclosure, as well as work in the enclosure to connect the cables to the buss bars. Access into the termination enclosure is made easier by inclusion in the termination enclosure of the upper horizontal member having the structure associated with this invention. Combining the inclusion of the removable lid associated with this invention and the horizontal member associated with this invention makes it extremely easy to access the interior of the termination enclosure. Finally, utilization of the lay-in buss bar makes it relatively easy to place the cables in their operative position by putting the cable into place, sliding the lay-in nut down into the recess of the lay-in channel, then screwing the set screw against the exposed portion of the cable.

A key aspect of this invention is that the removable lid, either alone or in conduction with the upper horizontal member herein described, facilitates easy access into the termination enclosure. This saves time and effort, in addition to making it far easier to conduct subsequent work within the enclosure.

Another key aspect of this invention is that the utilization of a lay-in buss bar in a termination enclosure saves time and effort when it comes to installing or servicing the cables in a termination enclosure.

Other key aspects of this invention concern the inclusion of the optional buss bar cover and the deadfront panel, one or both of which can be used with the termination enclosure.

While the form of apparatus herein described constitutes a preferred embodiment of the present invention, it is to be understood that the invention is not limited to this precise form of apparatus and that changes may be made therein without departing from the scope of the invention which is defined in the appended claims.

What is claimed is:

1. A pad-mounted termination enclosure comprising
a pair of side panels on opposite sides of said termination enclosure, each side panel having attached thereto a plurality of buss bar attachment means, said buss bar attachment means cooperating in pairs to support a plurality of buss bars extending between said side panels,
a first door attached to one of said side panels,
a second door attached to the other of said side panels,
an upper horizontal member extending between said side panels generally above said first door, and another upper horizontal member extending between said side panels above said second door, and
a lid positioned atop said pair of side panels and each of the upper horizontal members, said lid removably attached to said termination enclosure by lid attachment means.

2. The termination enclosure according to claim 1 wherein said lid attachment means comprise quick release levers, each of said quick release levers having an end portion, said side panels having apertures formed therein for the receipt of each end portion.

3. The termination enclosure according to claim 1 wherein said buss bar is a lay-in buss bar.

4. The termination enclosure according to claim 1 wherein at least one of said buss bars has a protective cover draped thereon.

5. The termination enclosure according to claim 1 wherein each of said upper horizontal members is easily detachable from said opposed side panels.

6. The termination enclosure according to claim 1 which includes a lower horizontal member extending between said side panels generally below said first door, and another lower horizontal member extending between said side panels below said second door, and which includes a deadfront panel in contact with said upper horizontal member and said lower horizontal member.

7. A pad-mounted termination enclosure comprising
a pair of side panels on opposite sides of said termination enclosure, each side panel having attached thereto a plurality of buss bar attachment means, said buss bar attachment means cooperating in pairs to support a plurality of lay-in buss bars extending between said side panels,
a first door attached to one of said side panels,
a second door attached to the other of said side panels,
an upper horizontal member extending between said side panels generally above said first door, and another upper horizontal member extending between said side panels above said second door, and
a lid positioned atop said pair of side panels and each of the upper horizontal members.

8. The termination enclosure according to claim 7 wherein at least one of said buss bars has a protective cover draped thereon.

9. The termination enclosure according to claim 7 wherein each of said upper horizontal members is easily detachable from said opposed side panels.

10. The termination enclosure according to claim 7 which includes a lower horizontal member extending between said side panels generally below said first door, and another lower horizontal member extending between said side panels below said second door, and which includes a deadfront panel in contact with said upper horizontal member and said lower horizontal member.

11. The termination enclosure according to claim 7 wherein said lid is removably attached to said termination enclosure by lid attachment means.

12. The termination enclosure according to claim 11 wherein said lid attachment means comprise quick release levers, each of said quick release levers having an end portion, said side panels having apertures formed therein for the receipt of each end portion.

13. A pad-mounted termination enclosure comprising
a pair of side panels on opposite sides of said termination enclosure, each side panel having attached thereto a plurality of buss bar attachment means, said buss bar attachment means cooperating in pairs to support a plurality of lay-in buss bars extending between said side panels,
a first door attached to one of said side panels,
a second door attached to the other of said side panels,
an upper horizontal member extending between said side panels generally above said first door, and another upper horizontal member extending between said side panels above said second door, each of said upper horizontal members being easily detachable from said opposed side panels, and
a lid positioned atop said pair of side panels and each of the upper horizontal members, said lid removably attached to said termination enclosure by lid attachment means.

14. The termination enclosure of claim 13 wherein at least one of said buss bars has a protective cover draped thereon.

15. The termination enclosure of claim 13 which includes a lower horizontal member extending between said side panels generally below said first door, and another lower horizontal member extending between said side panels below said second door, and which includes a deadfront panel in contact with said upper horizontal member and said lower horizontal member.

16. The termination enclosure according to claim 13 wherein said lid attachment means comprise quick release levers, each of said quick release levers having an end portion, said side panels having apertures formed therein for the receipt of each end portion.

* * * * *